Jan. 21, 1947.  L. A. MEACHAM  2,414,477
INDICATING APPARATUS
Filed Oct. 5, 1943  4 Sheets-Sheet 1
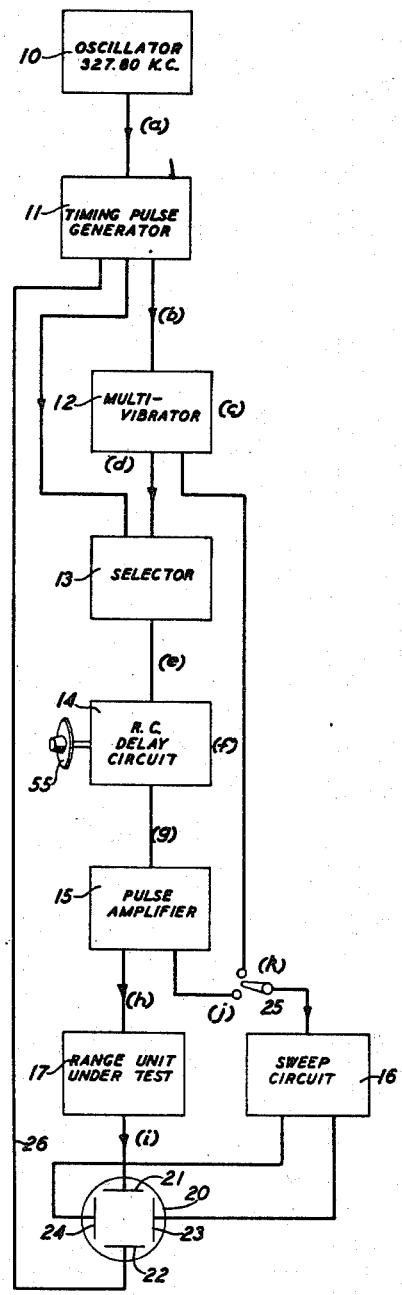
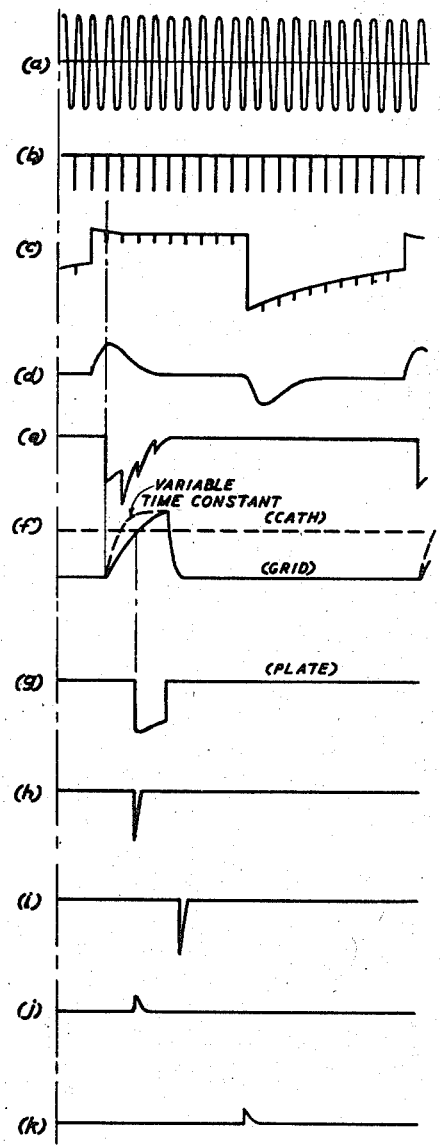
INVENTOR
L. A. MEACHAM
BY
*G. F. Heuerman*
ATTORNEY Jan. 21, 1947.   L. A. MEACHAM   2,414,477
INDICATING APPARATUS
Filed Oct. 5, 1943   4 Sheets-Sheet 3

INVENTOR
L. A. MEACHAM
BY
ATTORNEY

Patented Jan. 21, 1947

2,414,477

UNITED STATES PATENT OFFICE 2,414,477

INDICATING APPARATUS

Larned A. Meacham, Summit, N. J., assignor to Bell Telephone Laboratories, Incorporated, New York, N. Y., a corporation of New York Application October 5, 1943, Serial No. 505,025

16 Claims. (Cl. 161—15)

This invention relates to electrical indicating apparatus and particularly to apparatus for indicating the delay interval between pulses of a series of reference pulses and corresponding pulses of a series of pulses which are delayed with respect to the reference pulses.

Such delay indicating apparatus may be used, for example, for determining the range of a distant object by measuring the delay interval between pulses which are radiated to the object and corresponding echo pulses received from the object and it may also be used for calibrating such range measuring apparatus. The delay may be measured in units of distance, a delay of one microsecond being equivalent to a distance of 164 yards, approximately.

In my applications, Serial No. 491,791, filed June 22, 1943, and Serial No. 505,024, filed Oct. 5, 1943, there is disclosed electrical delay or range measuring apparatus of the type employing a timing wave generator which is started repeatedly in synchronism with the transmission of recurrent pulses towards an object, the distance to which is to be determined, the timing wave being generated during a portion of each period which separates successive transmitted pulses. A disadvantage of range measuring apparatus of this type is that frequency variations of the wave produced by the timing wave generator may occur notwithstanding precautions taken to prevent such variations, thus necessitating recalibration and readjustment of the range measuring apparatus from time to time.

There has also been proposed in an application of W. C. Tinus, Serial No. 339,585, filed June 8, 1940, a range measuring system in which there are transmitted towards an object a series of pulses having a frequency of recurrence equal to that of a relatively low frequency oscillator and in which harmonics of this frequency are selected for producing periodically recurrent timing pulses having a relatively high frequency of recurrence. A disadvantage of this system is that the transmitted pulses must recur periodically whereas an aperiodic transmitted pulse rate is often preferred because a range indicator employing a variable transmitted pulse rate is less subject to errors due to interference where several range indicators are operating in close proximity for example. Moreover, in that system filters are required for selecting harmonics of the master oscillator frequency for controlling the production of the timing pulses.

It is an object of the present invention to provide novel delay measuring apparatus which does not have the disadvantages mentioned above.

The disadvantages mentioned above are avoided in accordance with the present invention by employing a generator of constant high frequency waves for controlling the production of timing pulses having a frequency of recurrence preferably equal to the frequency of said waves and by generating reference pulses having a lower frequency of recurrence which is preferably a submultiple of the frequency of recurrence of the timing pulses. These reference pulses, or pulses in synchronism with the reference pulses, are transmitted towards an object, the distance of which is to be measured, or impressed upon a delay or range measuring apparatus which is to be calibrated. The generated waves may have a frequency of 327.80 kilocycles ±0.01 per cent for example, and the timing pulses may have the same frequency of recurrence so that the interval between successive timing pulses is 3.05 microseconds, approximately. Since 3.05 microseconds is the time required for a radiated pulse to travel to an object and for its echo to return when the object is at a distance of 500 yards, each timing pulse may be said to be delayed 500 yards with respect to the timing pulse which precedes it. The frequency of recurrence of the transmitted pulses, or of the pulses impressed upon the range unit to be calibrated, may vary and be of the order of 1/100 of the timing pulse frequency, for example.

In accordance with specific embodiments of the invention shown and described herein for the purpose of illustration, there is employed for producing an electrical wave having a fundamental frequency which is a submultiple of the frequency of the wave generated by the master constant frequency oscillator, a multivibrator circuit having adjustable means for varying over a wide range the frequency of the wave generated by the multivibrator. The frequency of recurrence of the reference pulses which are produced is equal to the frequency of the wave produced by the multivibrator circuit. The timing pulses are impressed upon the multivibrator circuit for causing successive half-cycles of the wave produced by the multivibrator to be started coincidentally with timing pulses to cause the period of each of the reference pulses to be an integral multiple of the period of the timing pulses, although the frequency of the multivibrator is adjustable and may vary from time to time independently of any adjustment. Moreover, there may be impressed upon the multivibrator circuit in addition to the timing pulses a voltage from a source such as a buzzer, an oscillator, etc., for causing the multivibrator frequency to vary while maintaining it at a submultiple (of varying order) of the timing pulse frequency. Pulses of the submultiple frequency are utilized for controlling the deflection of a cathode ray beam along one coordinate and the timing pulses and pulses in synchronism with the reference pulses are utilized for controlling the deflection of the beam along a second coordinate so that the patterns produced upon a luminescent screen to which the cathode ray beam is directed appear stationary and the phase relationship of the pulses may be observed. Alternatively, there may be utilized for controlling the deflection of the cathode ray beam along the second coordinate, a first series of pulses in synchronism with the reference pulses but delayed with respect to corresponding reference pulses by an amount which is to be measured, and a second series of pulses in synchronism with the reference pulses and delayed with respect to corresponding reference pulses by a measured amount which may be varied to bring the pulses of the second series into coincidence with pulses of the first series for the purpose of determining the unknown delay. Moreover, if desired, automatic means may be employed for maintaining the pulses of the first and second series in phase with respect to each other as is described in a copending application of B. M. Oliver, Serial No. 491,829, filed June 22, 1943.

The invention will now be described with reference to the accompanying drawings in which:

Fig. 1 is a block diagram of a range unit calibrating apparatus embodying the invention;

Figure 2:
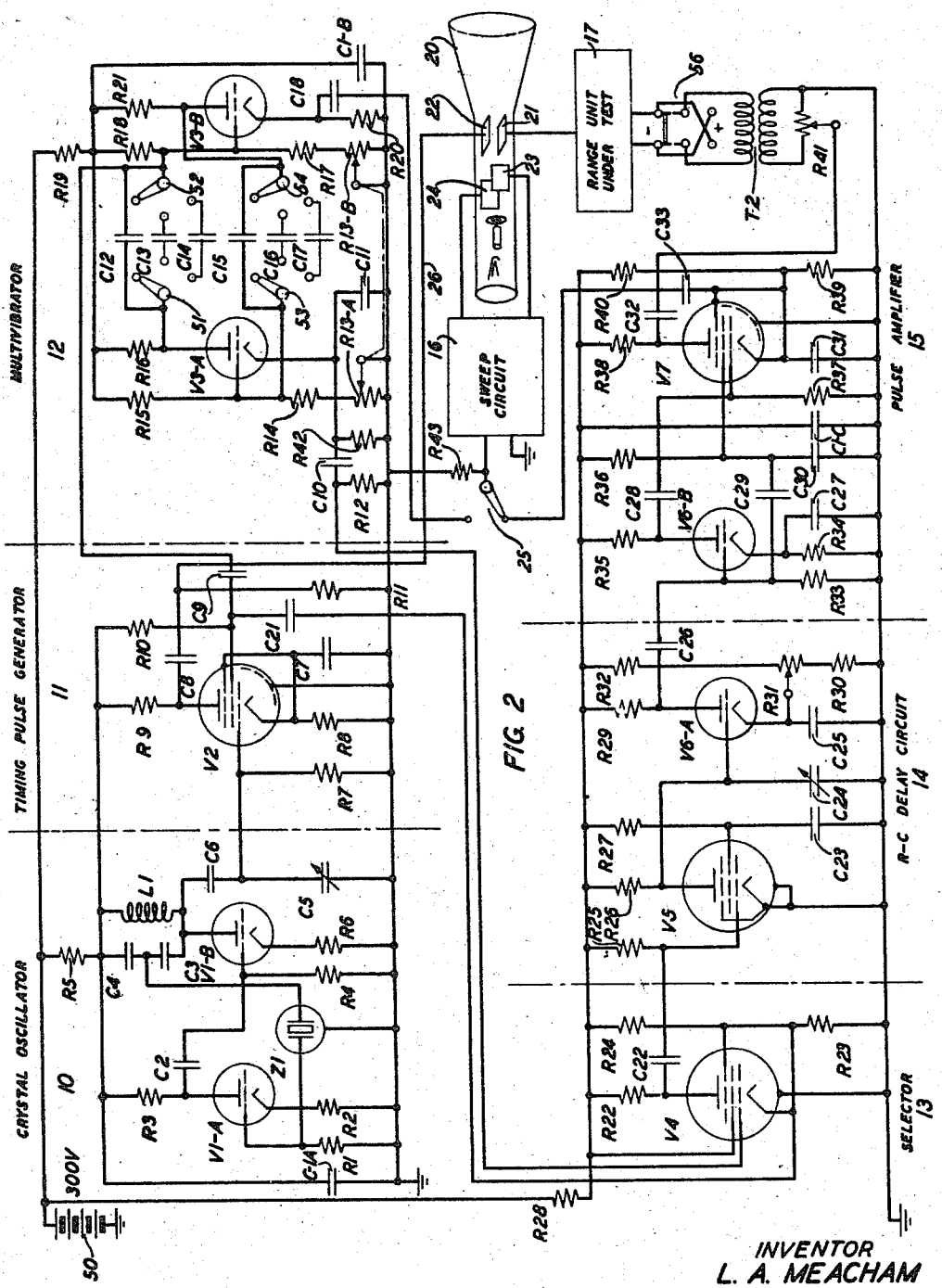
Fig. 2 is a schematic view showing the apparatus of Fig. 1 in greater detail.
Figure 4:
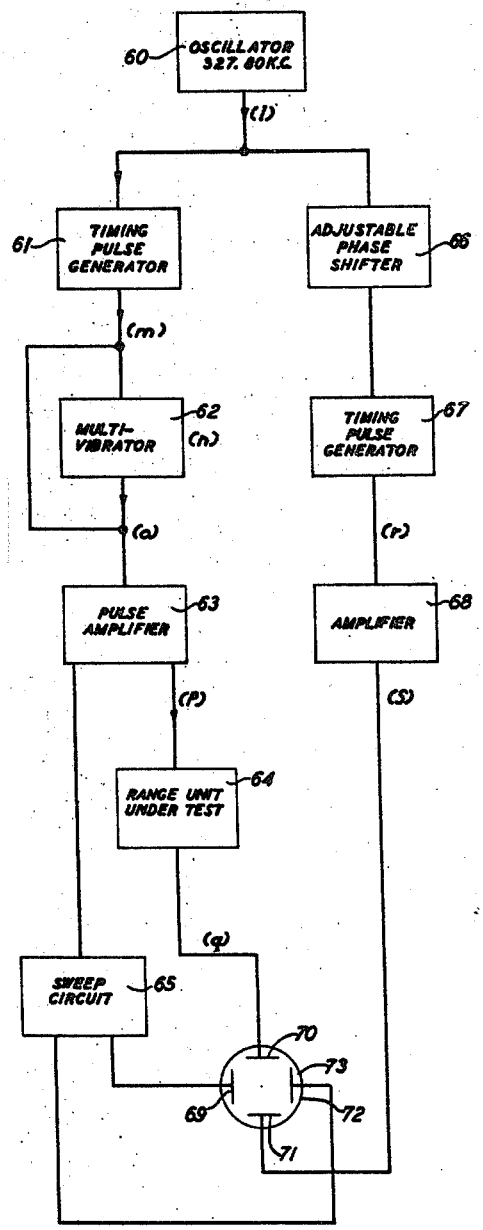
Figure 5:
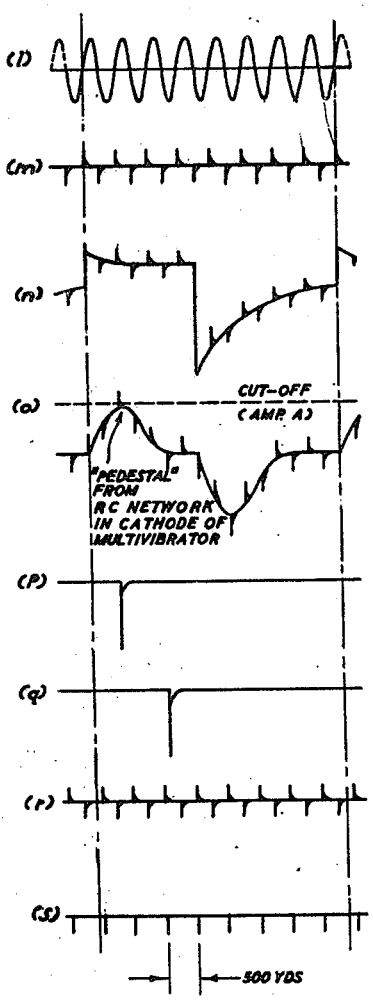
Figure 6:
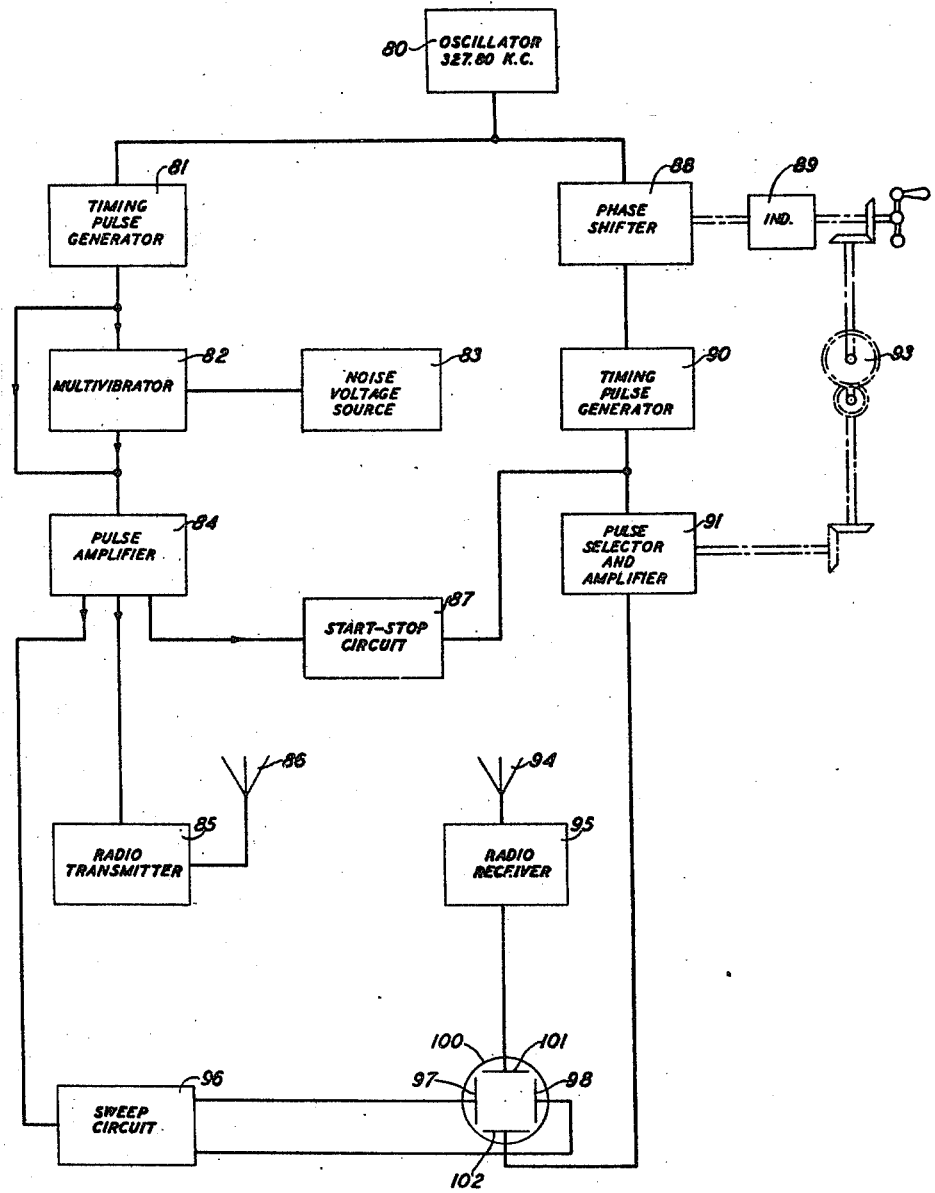

Fig. 3 consists of curves to which reference will be made in explaining the operation of the apparatus shown in Figs. 1 and 2;

Fig. 4 is a block diagram of a modification of the calibrating apparatus shown in Figs. 1 and 2;

Fig. 5 consists of curves to which reference will be made in explaining the operation of the calibrating apparatus of Fig. 4, and Fig. 6 is a block diagram of a range indicating apparatus embodying the invention.

Referring to the drawings, there is shown in the block diagram of Fig. 1 an apparatus for calibrating a range unit 17 which may be of the type disclosed in my copending applications, supra, for example. Such a range unit generates a series of output pulses which are delayed with respect to corresponding input pulses by an amount which may be varied and produces an indication of the delay in yards, for example. There is provided a constant frequency oscillator 10 which generates a wave of 327.80 kilocycles, for example, as depicted at $a$ in Fig. 3, and this wave is impressed upon a timing pulse generator 11 which generates periodic pulses $b$ having a frequency of recurrence equal to the frequency of the wave generated by the oscillator 10. These pulses are separated by a delay interval of 3.05 microseconds or 500 yards since the time required for a radiated pulse to travel to an object 500 yards away and for its echo to return is 3.05 microseconds. There is produced in a multivibrator circuit 12 a wave, as shown at $c$ in Fig. 3, the fundamental frequency of which is adjustable and which may vary somewhat independently of any adjustment. Under all conditions, however, each half-cycle of the wave $c$ is started coincidently with one of the pulses $b$ from the pulse generator 11. A wave $d$ obtained from a wave shaping circuit associated with the multivibrator circuit, together with the timing pulses from the generator 11, are impressed upon a selector circuit 13 which produces at its output a wave $e$ having a steep wave front coincident with a selected timing pulse which occurs at a peak of each positive half-cycle of wave $d$. The wave $e$ is impressed upon an RC delay circuit 14. This circuit comprising capacitance and resistance in series and has a time constant which may be varied by changing the value of the capacitance or of the resistance in the circuit. There is produced in this circuit a wave having an exponentially rising portion which starts coincidentally with each steep wave front of the wave $e$ and a wave $g$ having pulses, the leading edges of which are delayed with respect to the start of each exponentially rising portion of the wave $f$ by an amount determined by the time constant of the exponential circuit. The wave $g$ is impressed upon the input of a pulse amplifier 15 for producing a narrow output pulse $h$ substantially coincident with the leading edge of each pulse of wave $g$. The pulses $h$ which have a frequency of recurrence which is a submultiple of the frequency of the timing pulses $b$ are impressed upon the range unit 17 to be calibrated to produce at the output of the range unit similar pulses $i$ having the same frequency of recurrence but which are delayed with respect to the corresponding pulses $h$ by an amount determined by the setting of the pulse delay means in the range unit. The pulses $i$ from the output of the range unit and the timing pulses $b$ are impressed upon the vertical deflecting plates 21 and 22 respectively of a cathode ray tube. A horizontal sweep wave produced by a sweep circuit 16 is impressed upon the horizontal deflecting plates 23 and 24 of the cathode ray tube, the sweep circuit being controlled either by pulses $j$ from the pulse amplifier 15 which are coincident with pulses $h$ or by pulses $k$ from the multivibrator circuit which are coincident with the beginning of each negative half-cycle of wave $c$, the pulses $j$ and $k$ for controlling the sweep circuit being selected by a switch 25.

Since at any time the pulses $i$, $j$ and $k$ have the same frequency of recurrence which is a submultiple of the frequency of the timing pulses $b$, the visual indications produced by pulses $b$ and pulses $i$ upon the luminescent screen of cathode ray tube 20 will appear to be stationary except when the delay setting of the RC delay circuit 14 or that of the range unit 17 is being changed. The pulses $j$ and $k$ are provided for alternatively controlling the sweep circuit 16 so that the sweep wave can be started either coincidentally with the pulses $h$ or approximately mid-way between two successive pulses $h$. If the pulses $i$ appear near an edge of the cathode ray tube screen when the pulses $j$ are used for synchronizing the horizontal sweep wave, for example, the pulses $i$ can be made to appear near the center of the screen by shifting to pulses $k$.

The method of testing a range unit 17 is to initially set the unit for any desired delay between the pulses $h$ and $i$. The pulses $i$ are then brought into alignment with one of the timing pulses $b$ upon the cathode ray tube screen by varying the time constant of the RC delay circuit 14 by turning a knob 55 on the shaft of the condenser in the RC circuit. The delay setting of the range unit 17 is then changed with respect to the initial setting by steps of 500 yards which should bring the pulses $i$ into alignment or coincidence with successive timing pulses. If this does not occur, adjustment of the range unit to bring the pulses $i$ and $b$ into alignment on the cathode ray tube screen is required.

Referring now particularly to Fig. 2, the oscillator 10 comprises two triode electronic devices V1A and V1B and a piezoelectric crystal Z1 having a natural frequency of 327.80 kilocycles. Anode current is supplied to tube V1A from the positive terminal of a 300 volt direct current source 50 through 1,000 ohm resistor R5 and 10,000 ohm resistor R3 to anode, the cathode being connected through 2,200 ohm resistor R2 to the grounded negative terminal of voltage source 50. Filter condenser C1A of 0.1 microfarad is connected from the negative terminal of resistor R5 to ground. A 22,000 ohm resistor R1 connects the control electrode of tube V1A to ground. The anode current circuit for triode V1B may be traced from the negative terminal of resistor R5 through 500 microhenry inductance L1 shunted by condensers C3 and C4 in series having capacitances of 390 micromicrofarads and 0.0033 microfarad respectively, to the anode of triode V1B, and from the cathode through 2,200 ohm resistor R6 to ground. A common terminal of condenser C3, inductance L1 and the anode of tube V1B is connected through condenser C6 of 0.001 microfarad and 100 micromicrofarad variable condenser C5 to ground. The control grid of tube V1B is connected through 0.1 megohm leak resistor R4 to ground. The anode of triode V1A is connected through 0.001 microfarad condenser C2 to the control grid of triode V1B and the piezoelectric crystal is connected between the common terminal of condensers C3 and C4 to the control grid of triode V1A.

The 327.80 kilocycles sine wave $a$ generated in the crystal control oscillator circuit having a peak amplitude of about 200 volts is impressed upon the pulse generating circuit 11 by connecting the common terminal of condensers C5 and C6 to the control grid of electric discharge device V2, the cathode of which is connected to ground through 3,300 ohm resistor R8 shunted by 0.0047 microfarad condenser C7. A 1 megohm resistor K7 is provided for connecting the control grid of tube V2 to ground. Anode potential is applied to the tube from the negative terminal of resistor R5 through 3,300 ohm resistor R9 and screen grid potential is supplied from the negative terminal of resistor R5 through 1,000 ohm resistor R10. During the negative swing and most of the positive rise of each cycle of the sine wave produced by the oscillator, tube V2 is cut-off and the charge on condenser C7, due to the previous passage of anode current, leaks off through resistor R8. The time constant of R8C7 is short enough so that the cathode of tube V2 falls nearly to ground potential before the increasing grid potential reaches a value for which anode current commences to flow. This cut-off point is reached when the grid potential is still about 70 volts below its positive peak value and hence the slope of the wave is steep at this point. The rapid passage of the grid potential through this cut-off value causes a sudden flow of anode current of sufficient amplitude to cause the voltage across condenser C7 to rise at nearly the same rate as the increase in grid potential. The cathode potential thus follows the grid potential upward about 70 volts. Near the peak of the wave impressed upon the grid, the increase in cathode potential is somewhat less than the increase in grid potential, so that the grid becomes slightly positive with respect to the cathode and grid current flows momentarily to change the charge across condenser C5 due to the voltage drop across resistor R7. There is thus produced a biasing potential for the grid of tube V2 which leaks off through resistor R7 between the times when grid current flows. The anode of tube V2 is connected to ground through a differentiating circuit comprising 0.0033 microfarad condenser C8 and 180 ohm resistor R11 to produce 500 yard timing pulses at the common terminal of the resistor and condenser which is connected by way of lead 26 to the vertical deflecting plate 22 of the cathode ray tube 20.

There is provided an adjustable frequency multivibrator circuit comprising triodes V3A and V3B. Anode current is supplied from the 300 volt source 50 to tube V3A through a circuit comprising 1,000 ohm resistor R19, the negative terminal of resistor R19 being connected to ground through 0.1 microfarad filter condenser C1B, and 22,000 ohm resistor R16 to the anode of tube V3A, the cathode of the tube being connected to ground through a circuit having a 0.001 microfarad condenser C11 in one parallel branch, a 1,000 ohm resistor R42 in a second branch, and 0.0047 microfarad condenser C10 and 47,000 ohm resistor R12 in series in a third parallel branch. The anode current path for tube V3B may be traced from the negative terminal of resistor R19 through 22,000 ohm resistor R21 to the anode and from the cathode through 470 ohm resistor R20 to ground. A circuit for supplying biasing potential to the control grid of tube V3A may be traced from the negative terminal of resistor R19 through 1 megohm resistor R15, 0.1 megohm resistor R14 and 0.5 megohm variable resistor R13A to ground, the grid being connected to the common terminal of resistors R14 and R15. A similar circuit for biasing the grid of tube V3B may be traced from the negative terminal of resistor R19 through 1 megohm resistor R18, 0.1 megohm resistor R17 and 0.5 megohm variable resistor R13B to ground, the grid being connected to the common terminal of resistors R17 and R18. The variable contacts for resistors R13A and R13B are coupled to a common shaft (indicated by the dot-dash line) so that the resistance of the two resistors may be simultaneously, similarly varied. The anode of triode V3A is connected to the control grid of triode V3B through 0.001 microfarad condenser C12. When desired, 0.001 microfarad condenser C13 or 0.003 microfarad condenser C14 may be connected in parallel with condenser C12 by means of switches 51 and 52. The anode of triode V3B is connected to the control grid of triode V3A through 0.001 microfarad condenser C15 and, when desired, 0.001 microfarad condenser C16 or 0.003 microfarad condenser C17 may be connected in parallel with condenser C15 by means of switches 53 and 54. The frequency range of the wave $c$ produced by the multivibrator circuit is between 420 and 1090 cycles when condensers C12, C14, C15 and C17 are in circuit, between 860 and 2170 cycles when condensers C12, C13, C15 and C16 are in circuit, and between 1760 and 4450 cycles when condensers C12 and C15 are in circuit. Within each of these ranges the frequency may be varied by varying the resistors R13A and R13B and, moreover, the frequency may vary somewhat independently of any change of the circuit constants.

The screen grid of tube V2 is connected through 22 micromicrofarad condenser C9 to the control grid of triode V3B for impressing timing pulses b thereon. When tube V3A is about to become conducting, the leading edge of a negative pulse b applied to the grid of tube V3B causes the anode current to decrease suddenly with the result that the potential at the anode of V3B suddenly increases and a positive pulse is applied to the grid of tube V3A to start conduction of anode current through that tube. The first half-cycle of the potential wave c produced at the anode of tube V3B is then initiated coincidentally with one of the timing pulses b. When tube V3B is about to become conducting it has been found that conduction is also started coincidentally with timing pulse b. This is believed to be caused by the potential of the grid of tube V3B becoming relatively more positive due to the rising, lagging edge of a negative timing pulse b. The start of each half-cycle of the wave c produced in the multivibrator could also be made coincident with timing pulses b by applying the timing pulses to the grid of tube V3A as well as to the tube V3B and having the pulse impressed upon the grid of each tube due to the change in anode potential of the other tube predominant over the pulse which is applied to the grid directly from the pulse generator 11. When switch 25 is in its upper positions, the cathode of tube V3B is connected to a differentiating circuit comprising 0.00022 microfarad condenser C18 and 10,000 ohm resistor R43 to ground to produce pulses k having a frequency equal to a submultiple of the frequency of the timing pulses b, the pulses k being applied to the horizontal sweep circuit 16.

The common terminal of condenser C10 and resistor R12 is connected to the control grid of electronic device V4 of the selector circuit 13 for impressing thereon with respect to ground the potential wave d. The screen grid of tube V2 is connected through a coupling circuit comprising 0.0033 microfarad condenser C21 and 33,000 ohm resistor R23 to ground for impressing the timing pulses b upon the cathode of tube V4. Anode potential is supplied to tube V4 from the 300 volt source through 1,000 ohm resistor R28 and 0.22 megohm resistor R22. Positive biasing potential is supplied to the cathode of tube V4 by connecting it to the common terminal of resistor R23 and 0.22 megohm resistor R24, the other terminal of which is connected to the negative terminal of resistor R28. The bias thus produced is sufficient to maintain the tube in a normally non-conducting state. Filter condenser C1C connects the negative terminal of resistor R28 to ground. At the time that the potential wave d impressed upon the control grid of tube V4 is at or near its positive peak, the negative pulse b impressed upon its cathode causes the tube V4 suddenly to draw space current and, as a result, the potential at the anode is sharply decreased as shown at e in Fig. 3. The tube V4 is energized by several of the succeeding timing pulses b to produce the wave shown at e at the tube anode because the positive pedestal wave d tapers off to zero over a period including several timing pulses b. The wave e is applied to the control grid of electronic device V5 of the RC delay circuit 14 by connecting the anode of tube V4 through 470 micromicrofarad condenser C22 to the grid of tube V5. The tube V5 which is normally conducting, is cut-off due to the initial negative pulse of wave e. Due to stray capacitance, the anode of tube V4 and the control grid of tube V5 are prevented from returning to normal potential during the intervals between successive timing pulses b while the wave d remains positive and tube V5 therefore remains cut-off throughout the period of the positive pedestal control of wave d.

Anode potential is supplied to tube V5 by connecting its anode through 0.15 megohm resistor R26 to the negative terminal of resistor R28, the cathode being grounded. The control electrode of the tube is positively biased by connecting it through 2.2 megohm resistor R25 to the negative terminal of resitor R28. The negative terminal of resistor R28 is also connected through 0.1 megohm resistor R27 and 470 micromicrofarad condenser C23 to ground and the screen grid of tube V5 is connected to the common terminal of condenser C23 and resistor R27 for supplying positive potential thereto. The anode of tube V5 is connected directly to the control grid of tube V6A and through 100 micromicrofarad variable condenser C24 to ground. Anode potential is supplied to tube V6A by connecting the anode through 0.22 megohm resistor R29 to the negative terminal of resistor R28. There is provided a current path from the negative terminal of resistor R28 through 0.1 megohm resistor R32, 20,000 ohm potentiometer R31 and 47,000 ohm resistor R30 to ground. The variable tap of the potentiometer R31 is connected to the cathode and through 0.001 microfarad condenser C25 to ground for biasing the cathode positively to make tube V6A normally non-conducting. While the control electrode of tube V5 is biased positively, its plate rests at only a few volts above ground potential, condenser C24 being almost completely discharged. When the tube V5 is rendered non-conducting due to the negative potential impressed upon its control grid, the condenser C24 is charged exponentially with a time constant which is linearly adjustable by varying the capacity of condenser C24, the setting of which may be varied by turning the knob 55 on its rotor shaft. When the resulting potential at the grid of tube V6A has increased sufficiently, space current commences to flow suddenly to cause the production of a negative pulse g at the anode.

This negative pulse is impressed upon the pulse amplifier 15, comprising electronic devices V6B and V7, by connecting the 470 micromicrofarad condenser C26 from the anode of tube V6A to the control grid of tube V6B, the control grid being connected to ground through the 1 megohm resistor R33. The anode current path of triode V6B may be traced from the negative terminal of resistor R28 through 22,000 ohm resistor R35 to the anode, and from the cathode through 470 ohm resistor R34 shunted by 0.0033 microfarad condenser C27 to ground. The anode of tube V6B is connected through 100 micromicrofarad condenser C28 and 0.1 megohm resistor R37 in series to ground and the common terminal of the condenser and resistor is connected to the control grid of tube V7. Positive biasing potential is provided for the cathode of tube V7 by connecting it to the common terminal of the potential dividing resistors R40 (0.22 megohm) and R39 (22,000 ohms) which are connected in series between the negative terminal of resistor R28 and ground, the resistor R39 being shunted by 0.0033 microfarad condenser C31. Anode potential is applied to tube V7 from the negative terminal of resistor R28 through 0.1 megohm resistor R38. Screen grid potential is applied to tube V7 from the negative terminal of resistor R28 through 22,000 ohm resistor R36, the common terminal of resistor R36 and the screen grid being connected through 470 micromicrofarad condenser C30 to ground. The anode of tube V7 is connected through 0.001 microfarad condenser C32 to the variable tap of 2,000 ohm potentiometer R41, one terminal of which is grounded. The primary winding of output transformer T2 is connected across the terminals of potentiometer R41 for producing pulses h across the secondary winding of the transformer. These pulses, the polarity of which may be reversed by means of the reversing switch 56, are impressed upon the range unit 17 under test and the output pulses i from the range unit are impressed upon the vertical deflecting plate 21 of the cathode ray tube 20.

When tube V6A becomes conducting due to the exponentially rising voltage across condenser C24, the potential at the anode of tube V6A is reduced and the condenser C26 discharges through a circuit comprising the anode-cathode path of tube V6A and resistance R33. Tube V6B which normally conducts, is thus cut-off and remains cut-off due to the voltage drop across resistor R33 during the remainder of the period in which tube V6A is conducting. The interruption of conduction through tube V6B causes the production of a positive pulse at the control grid of tube V7 causing it to pass extremely large anode current momentarily thus producing a negative pulse at the anode of tube V7. A negative pulse is also produced at the screen grid electrode of tube V7 which is connected through 47 micromicrofarad condenser C29 to the control grid of triode V6B, thus reinforcing the negative pulse impressed upon the grid of tube V6B from the anode of tube V6A. Tube V6B is thus cut-off very abruptly and remains cut-off until condenser C24 is discharged through the anode-cathode path of tube V5 sufficiently to interrupt conduction through tube V6A. The cathode of tube V7 is connected through 39 micromicrofarad condenser C33 to the lower contact of switch 25 for producing pulses j for controlling the horizontal sweep circuit 16 when the switch is in its lower position.

Fig. 4 shows a range unit calibrating circuit which is a modification of the circuit shown in Figs. 1 and 2. An oscillator 60, like the oscillator 10, supplies a constant frequency sine wave l (Fig. 5) having a frequency of 327.80 kilocycles to a timing pulse generator 61 like the timing pulse generator disclosed in my application, Serial No. 505,024, filed Oct. 5, 1943. This generator produces positive and negative pulses alternatively as shown at m, Fig. 5, a negative pulse being produced at the beginning of a negative half-cycle of sine wave l' and a positive pulse being produced at the beginning of each positive half-cycle. There is provided a multivibrator 62 similar to the multivibrator 12 comprising the triodes V3A and V3B. The timing pulses m are impressed upon the grid of tube V3A so that the positive half of the wave n produced in the multivibrator will be started coincidentally with a positive timing pulse and the negative half-wave will be started coincidentally with a negative timing pulse. A pedestal potential wave o, similar to the wave d of Fig. 3, produced at the cathode of tube V3A having pulses m superimposed thereon is impressed upon a control grid of an electronic device in pulse amplifier 63 so that a positive timing pulse at or near the peak of the pedestal wave will rise above the cut-off of the pulse amplifier 63 to produce output pulses p, coincidentally with timing pulses m but at a rate of recurrence which is a submultiple of the rate of recurrence of timing pulses m. The pulses p are impressed upon a range unit under test to produce at the output thereof pulses q in synchronism with pulses p but delayed with respect to corresponding pulses p by an amount determined by the delay or range setting of the range unit. Pulses p or pulses in synchronism therewith derived from the pulse amplifier 63 are impressed upon a horizontal sweep circuit 65 for generating a horizontal sweep wave which is applied to the horizontal deflecting plates 69 and 72 of cathode ray tube 73. The pulses q are impressed upon one of the vertical deflecting plates 70 of the cathode ray tube. The sine wave from oscillator 60 is also impressed upon a circuit comprising an adjustable phase shifter 66 and the phase shifted sine wave is impressed upon a timing pulse generator 67 like the generator 61 for producing timing pulses r like the timing pulses m. These pulses r are impressed upon an amplifier 68 which is biased to cut-off the pulses of one polarity to produce at its output circuit 500 yard timing pulses s which are impressed upon the vertical deflecting plate 71 of the cathode ray tube.

In testing a range unit, it is initially set to give any desired delay, say 100 yards, and the timing pulses are shifted in phase by varying the setting of phase shifter 66 until the indications produced upon the cathode ray tube screen by the pulses q are in alignment with the indication produced by certain ones of the timing pulses s, that is, certain timing pulses s are brought into coincidence with the pulses q. The delay setting of the range unit is then changed in steps of 500 yards, this being the delay between successive timing pulses s. If the pulses q are then not coincident with timing pulses s, as indicated on the cathode ray tube screen, the range unit requires adjustment to bring the indication on the cathode ray tube screen corresponding to pulses q into alignment with the indication corresponding to certain timing pulses s.

In Fig. 6 there is disclosed a range or distance indicator embodying the invention. The portion of the circuit comprising oscillator 80, timing pulse generator 81, multivibrator 82 and pulse amplifier 84, is like the portion of Fig. 4 comprising oscillator 60, timing pulse generator 61, multivibrator 62 and pulse amplifier 63. This portion of the circuit produces range pulses like the pulses p which are impressed upon a radio transmitter 85 to control the transmission of corresponding pulses of radio frequency energy from antenna 86 to a distant object and the corresponding echo pulses are received upon an antenna 94 and radio receiver 95. There are thus produced at the output of the radio receiver and impressed upon a vertical deflecting plate 101 of a cathode ray tube 100 pulses like the pulses q which are delayed with respect to the pulses impressed upon the radio transmitter by an amount which varies in accordance with the distance to the object. The sweep circuit 96 produces a horizontal sweep wave which is impressed upon the horizontal deflecting plates 97 and 98 of the cathode ray tube, this wave being synchronized with the radiated pulses and the echo pulses under control of pulses from the pulse amplifier 84 so that the indication on the cathode ray tube screen produced by the echo pulses remains stationary upon the screen, when the object from which the echoes are received is stationary, independently of changes in frequency of the pulses from amplifier 84. A noise voltage source 83, such as a buzzer or oscillator, is provided for impressing a voltage upon the multivibrator circuit to cause the frequency of the multivibrator wave to vary while maintaining the start of each cycle coincident with a selected one of the timing pulses. It is desirable that the frequency of the multivibrator and, therefore, the frequency of recurrence of the transmitted pulses should vary in order to avoid or reduce interference which otherwise would occur when several range indicators are being operated in close proximity.

There are also provided a phase shifter 88 for shifting the phase of the sine wave from oscillator 80 and for supplying the phase shifted wave to a timing pulse generator 90. Pulses from the pulse amplifier 84 are impressed upon a start-stop circuit, the output wave of which is impressed upon the input circuit of a pulse selector and amplifier 91 together with the timing pulses from the generator 90. The start-stop circuit 87, the phase shifter 88, timing pulse generator 90 and pulse selector 91 may be the same as the corresponding parts disclosed in my application, Serial No. 505,024. As therein disclosed, the condenser shaft of the phase shifter and the potentiometer shaft of the pulse selector are connected through gears 93 and there is provided an indicator 89 on the shaft of phase shifter 88. The pulses produced at the output of the pulse selector 91 are in synchronism with the pulses produced at the output of the pulse amplifier 84 but are delayed with respect to corresponding pulses from the pulse amplifier by an amount which may be varied continuously by rotating the shaft of phase shifter 88. The range pulses from the selector 91 are impressed upon the vertical deflecting plate 102 of the cathode ray tube. In operation, the phase of the range pulses from the pulse selector 91 is shifted to bring the indication corresponding to these pulses on the screen of the cathode ray tube into alignment with the indication produced by the echo pulses from the receiver 95. The distance of the object may then be read directly from the indicator 89 which is preferably calibrated in units of distance.

What is claimed is:

1. In combination, means for generating a continuous constant frequency alternating wave, means for producing under control of said wave a first series of pulses having a constant frequency of recurrence which is controlled in accordance with the frequency of said alternating wave, means for producing a second series of pulses having a longer period than that of said first series of pulses, means under control of the pulses of said second series for producing a third series of pulses which are delayed with respect to the corresponding pulses of said second series by an interval which may vary, the phase relationship between the pulses of said first and second series being such that successive pulses of said third series are coincident with pulses of said first series.

2. Electric delay measuring apparatus comprising means for generating a continuous constant frequency alternating wave, means under control of said wave for producing a first series of similar pulses having a frequency of recurrence equal to the frequency of said wave, means under control of said wave for producing a second series of pulses having a longer period than that of said first series of pulses, means under control of pulses of said second series for producing a third series of pulses which are delayed with respect to corresponding pulses of said second series by an interval which may vary, and means for indicating said delay interval comprising means for shifting the phase of the pulses of one of said first and second series to bring said delayed pulses of said third series into coincidence with pulses of said first series.

3. Electric delay measuring apparatus comprising means for generating a continuous constant frequency alternating wave, means under control of said wave for producing a first series of similar pulses having a frequency of recurrence equal to the frequency of said wave, means under control of said wave for producing a second series of pulses the period of which is an integral multiple of that of said first series of pulses, means under control of the pulses of said second series for producing a third series of pulses having the same period as the pulses of said second series and which are delayed with respect to corresponding pulses of said second series by intervals which may vary, and means utilizing pulses of said first series for indicating said delay.

4. Electric delay measuring apparatus in accordance with claim 3 in which are provided a cathode ray device having a luminescent screen, means for generating a cathode ray beam and means for deflecting the cathode ray beam, means under control of pulses of said first and third series of pulses for causing a deflection of said cathode ray beam along one coordinate, means for producing a substantially linear sweep wave synchronized with the pulses of said second series of pulses, and means under control of said sweep wave for deflecting said cathode ray beam along a second coordinate.

5. Electric delay measuring apparatus comprising a generator of a continuous constant frequency alternating wave, a cathode ray device having means for directing a cathode ray beam to a luminescent screen and means for deflecting the beam along two coordinates, means for producing a first series of pulses the frequency of recurrence of which is determined by the frequency of said wave, means for producing a second series of pulses the period of which may vary but which is at all times an integral multiple of the period of the first series, means for producing under control of the pulses of said second series a third series of pulses the period of which is equal to that of said second series but which are delayed with respect to corresponding pulses of said second series by intervals which may vary, means for causing said cathode ray beam to be repeatedly deflected along one of said coordinates at a rate of repetition corresponding to the period of the second series of pulses, means under control of said first and third series of pulses for causing the deflection of said cathode ray beam along the second of said coordinates, and means for measuring changes in said delay interval comprising means for changing the phase relationship of the pulses of the first and third series for bringing pulses of said first series into coincidence with pulses of said third series.

6. Electric delay measuring apparatus comprising a generator of a continuous constant frequency alternating wave, means under control of said wave for producing a first series of pulses having a period which is an integral multiple of the period of said wave, means for producing under control of the pulses of said first series a second series of pulses having a period equal to that of said first series but which are delayed with respect to corresponding pulses of said first series by intervals which may vary, means under control of said wave for producing a third series of pulses having a period equal to that of said first and second series of pulses, means for shifting the phase of the pulses of said third series with respect to the pulses of said first series for bringing the pulses of said third series into coincidence with corresponding pulses of said second series, thereby making the delay of the pulses of said third series with respect to corresponding pulses of said first series equal to the delay of pulses of said second series with respect to corresponding pulses of said first series, and means for indicating said delay.

7. Apparatus in accordance with claim 6 in which means are provided for producing a visual indication of the phase relationship of the pulses of said second series with respect to the pulses of said third series, said means comprising a cathode ray device having a luminescent screen upon which an indication is produced in accordance with the deflection of a cathode ray beam, means for repeatedly deflecting said beam along one coordinate at a frequency of repetition corresponding to the period of one of said series of pulses, and means for deflecting said beam along another coordinate under control of the pulses of said second and third series of pulses.

8. Electric delay measuring apparatus comprising a generator of a continuous constant frequency alternating wave, means for producing under control of said wave a first series of pulses having a period which is an integral multiple of the period of said wave, means for causing the period of said first series of pulses to vary while maintaining said period at an integral multiple of the period of said alternating wave, means for producing under control of said pulses of said first series a second series of pulses having a period equal to the period of said first series of pulses but which are delayed by varying amounts with respect to the corresponding pulses of said first series, means under control of said alternating wave and said first series of pulses for producing a third series of pulses having a period equal to that of said first series of pulses, means for continuously shifting the phase of the pulses of said third series to bring them into coincidence with corresponding pulses of said second series, thereby making the delay of the pulses of said third series with respect to corresponding pulses of said first series equal to the delay of the pulses of said second series with respect to corresponding pulses of said first series, and means coupled to said phase shifting means for indicating said delay.

9. In an electric delay measuring apparatus, a generator of a continuous constant frequency alternating wave, means for producing a first series of periodically recurring pulses having a frequency of recurrence equal to the frequency of said wave, means under control of the pulses of said first series for generating a second series of pulses the period of which is an integral multiple of the period of said first series of pulses, means for shifting the phase of the pulses of said second series with respect to pulses of said first series, a cathode ray device having means for directing a cathode ray beam upon a luminescent screen, means under control of the pulses of said second series for causing said beam to be repeatedly deflected along one coordinate at a frequency of repetition corresponding to the period of said second series of pulses, and means under control of the pulses of said first series for causing said beam to be deflected along a second coordinate, whereby there is produced upon said screen a visual indication of a plurality of the pulses of said first series simultaneously which indication is shifted in the direction of said first coordinate due to a phase shift of the pulses of said second series.

10. An electric delay measuring apparatus comprising means for generating a continuous constant frequency alternating wave, means for producing a first series of periodically recurring pulses having a frequency of recurrence equal to the frequency of said wave, means under control of pulses of said first series for generating a second series of pulses having a period which is an integral multiple of the period of said first series of pulses, means for shifting the phase of the pulses of said second series with respect to pulses of said first series, means for producing a third series of pulses similar to said second series but which are delayed with respect to corresponding pulses of said second series by an amount which may vary, a cathode ray device having means for directing a cathode ray beam upon a luminescent screen, means under control of pulses of said second series for causing said beam to be repeatedly deflected along one coordinate at a frequency of repetition corresponding to the period of said second series of pulses, and means under control of the pulses of said first and third series for causing said beam to be deflected along a second coordinate, whereby there is produced upon said screen a visual indication corresponding to said first and third series of pulses, the position upon the screen of said first series of pulses varying in accordance with said phase shift and the position upon said screen of the visual indication corresponding to said third series of pulses varying in accordance with the amount of said delay.

11. An electric delay measuring apparatus comprising a generator of a continuous constant frequency alternating wave, means for producing a first series of periodically recurring pulses having a frequency of recurrence equal to the frequency of said wave, means under control of pulses of said first series for generating a second series of pulses and a third series of pulses, each of said second and third series having a period which is an integral multiple of the period of said first series of pulses, means for shifting the phase of the pulses of said third series with respect to the pulses of said second series, a cathode ray device having means for directing a cathode ray beam upon a luminescent screen, means under control of pulses of said second series for causing said beam to be repeatedly deflected along one coordinate at a frequency of repetition corresponding to the period of the second series of pulses, means for producing a fourth series of pulses similar to said third series of pulses but which are delayed with respect to corresponding pulses of said third series by an amount which may vary, means for utilizing said first series of pulses and said fourth series of pulses to cause said beam to be deflected along a second coordinate to produce upon said screen a visual indication corresponding to said first and fourth series of pulses, the position upon the screen of the visual indication corresponding to said first series of pulses being fixed and that corresponding to the fourth series of pulses varying in accordance with changes of said phase shift and changes of said delay.

12. In combination, means for generating a continuous constant frequency alternating wave, means under control of said wave for producing a series of similar pulses having a period equal to the period of said wave, a multivibrator for generating an output wave having a period which is at least several times the period of said alternating wave, means for impressing upon said multivibrator a wave for causing the period of the multivibrator output wave to vary, and means for impressing said pulses upon said multivibrator for causing successive cycles of the output wave produced by said multivibrator to be started in response to and coincidently with pulses, respectively, of said series of pulses which are spaced by unequal time intervals, thereby causing the period of said multivibrator output wave to be a changing integral multiple of the period of said pulses.

13. Means for measuring the delay interval between pulses of a series of input pulses impressed upon a variable delay system and corresponding pulses of a series of output pulses delivered by said system in response to the input pulses impressed thereon comprising means for generating a constant frequency alternating wave, means for producing under control of said wave a first series of similar pulses having a fixed period of recurrence determined by the period of said wave, means for producing said series of input pulses comprising a space discharge device and means for causing said device to conduct space current intermittently during periods which are long relative to the period of recurrence of said first series of pulses, means for impressing said first series of pulses upon said input pulse producing means for initiating conduction of space current in said device coincidentally with pulses of said first series of pulses, thereby causing the pulses of said series of input pulses to have a period of recurrence which may vary but which is at all times an integral multiple of the period of recurrence of said pulses of said first series, a cathode-ray device having means for directing a cathode-ray beam upon a luminescent screen, means under control of said input pulses for causing said beam to be repeatedly deflected along one coordinate at a frequency of repetition corresponding to the period of said input pulses, means for impressing upon said cathode-ray device said series of output pulses and a second series of pulses having a period equal to the period of said first series of pulses or an integral multiple thereof for causing said cathode-ray beam to be deflected along a second coordinate and means for varying by known amounts the delay interval between pulses of said second series of pulses and corresponding pulses of said series of input pulses.

14. Means for measuring the delay interval between pulses of a series of input pulses impressed upon a variable delay system and corresponding pulses of a series of output pulses delivered by said system in response to the input pulses impressed thereon comprising means for generating a continuous constant frequency alternating wave, means for producing under control of said wave a first series of similar pulses having a period of recurrence equal to the period of said wave, means for producing said series of input pulses comprising a multivibrator circuit the natural period of which is long relative to the period of recurrence of said first series of pulses including a pair of space discharge devices and means for causing said devices to conduct space current during alternate intervals, means for impressing said first series of pulses upon said multivibrator circuit for initiating coincidentally with pulses of said first series conduction in a space discharge device of said pair which was previously non-conducting and interrupting conduction in a space discharge device of said pair which was previously conducting, thereby causing the pulses of said series of input pulses to have a period of recurrence which may vary but which is at all times an integral multiple of the period of recurrence of said pulses of said first series, a cathode-ray device having means for directing a cathode-ray beam upon a luminescent screen, means under control of said input pulses for causing said beam to be repeatedly deflected along one coordinate at a frequency of repetition corresponding to the period of said input pulses, means for impressing upon said cathode-ray device said series of output pulses and said first series of pulses for causing said cathode-ray beam to be deflected along a second coordinate and means for varying by known amounts the time of occurrence of said input pulses each with respect to a preceding pulse of said first series of pulses which is coincident with the starting of conduction in one of said space discharge devices and the interruption of conduction in the other of said space discharge devices.

15. Means for measuring the delay interval between pulses of a series of input pulses impressed upon a variable delay system and corresponding pulses of a series of output pulses delivered by said system in response to the input pulses impressed thereon comprising a source of constant frequency alternating voltage, means for producing under control of said alternating voltage a first series of alternately positive and negative pulses having a fixed period of recurrence determined by the period of said alternating voltage, means for producing said series of input pulses comprising a space discharge device and means for causing said device to conduct space current intermittently during periods which are long relative to the period of recurrence of said first series of pulses, means for impressing said first series of pulses upon said input pulse producing means for initiating conduction of space current in said device coincidentally with pulses of said first series of pulses, thereby causing the pulses of said series of input pulses to have a period of recurrence which may vary but which is at all times an integral multiple of the period of recurrence of said pulses of said first series. a cathode-ray device having means for directing a cathode-ray beam upon a luminescent screen, means under control of said input pulses for causing said beam to be repeatedly deflected along one coordinate at a frequency of repetition corresponding to the period of said input pulses, means under control of voltage from said alternating voltage source for producing a second series of pulses having a period of recurrence equal to the period of recurrence of the pulses of said first series. means for impressing upon said cathode-ray device said output pulses and said pulses of said second series for controlling the deflection of said cathode-ray beam along a second coordinate and means for shifting the phase of the voltage from said source supplied to said means for producing said second series of pulses for correspondingly changing by known amounts the delay of said pulses of said second series with respect to corresponding pulses of said first series.

16. Means for measuring the delay interval between pulses of a series of input pulses impressed upon a variable delay system and corresponding pulses of a series of output pulses delivered by said system in response to input pulses impressed thereon comprising a source of constant frequency alternating voltage, means for producing under control of voltage from said source a first series of pulses having a frequency of recurrence determined by the period of said alternating voltage, means for producing said series of input pulses comprising a space discharge device and means for causing said device to conduct space current intermittently during periods which are long relative to the period of recurrence of said first series of pulses, means for impressing said first series of pulses upon said input pulse producing means for initiating conduction of space current in said device coincidentally with pulses of said first series of pulses, thereby causing the pulses of said series of input pulses to have a period of recurrence which may vary but which is at all times an integral multiple of the period of recurrence of said pulses of said first series, a cathode-ray device having means for directing a cathode-ray beam upon a luminescent screen, means under control of said input pulses for causing said beam to be repeatedly deflected along one coordinate at a frequency of repetition corresponding to the period of recurrence of said input pulses, means under control of voltage from said source and said input pulses for setting up a second series of pulses having a period of recurrence equal to that of said input pulses, means under control of said second series of pulses and said output pulses for controlling the deflection of said cathode-ray beam along a second coordinate and means for delaying the pulses of said second series by a varying known amount for measuring the delay interval between said input pulses and corresponding output pulses.

LARNED A. MEACHAM.

Disclaimer 2,414,477.—*Larned A. Meacham*, Summit, N. J. INDICATING APPARATUS. Patent dated Jan. 21, 1947. Disclaimer filed Nov. 18, 1949, by the assignee, *Bell Telephone Laboratories, Incorporated.*

Hereby enters this disclaimer to claim 6 in said patent.

[*Official Gazette January 3, 1950.*]